Patented July 8, 1952

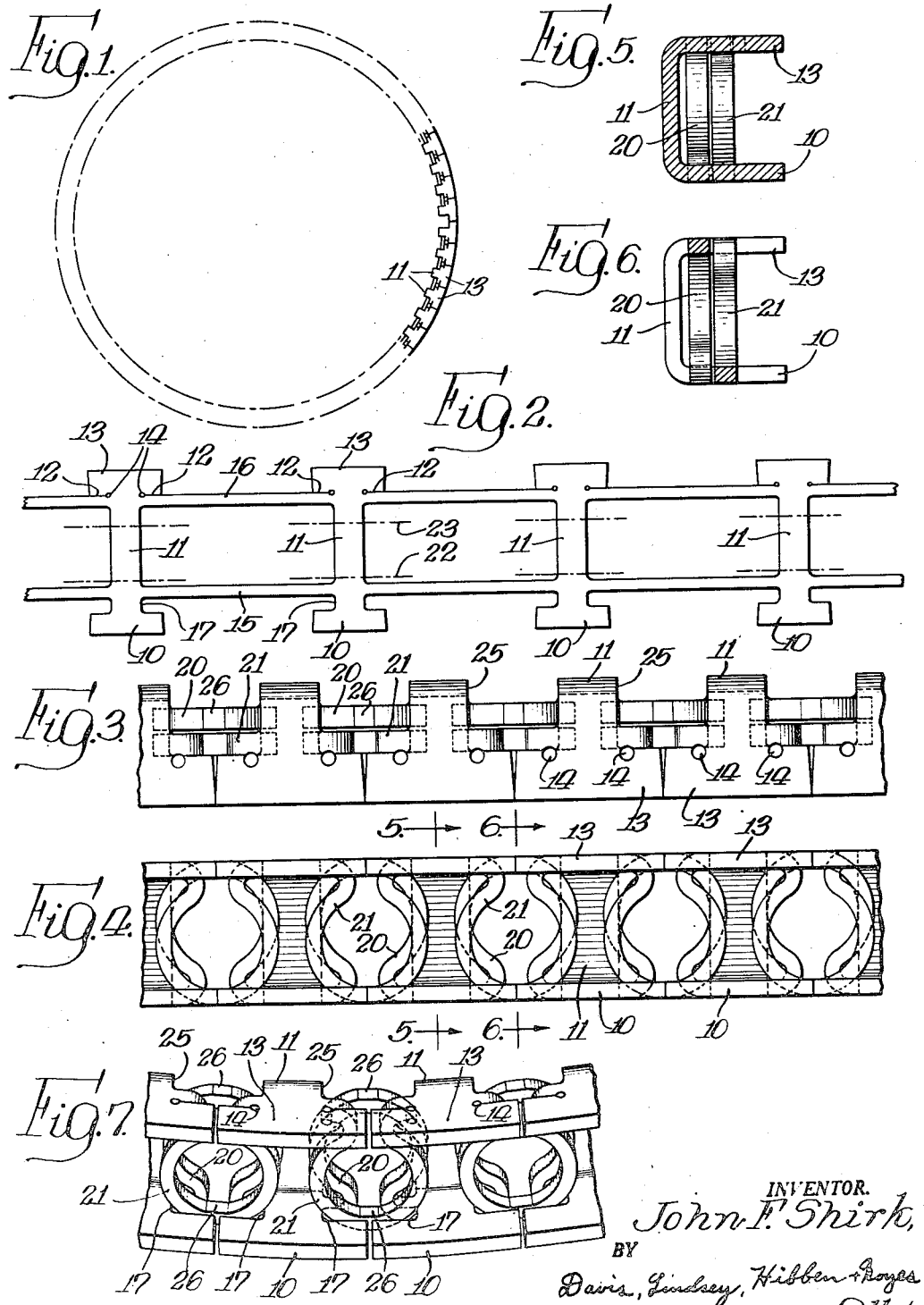

2,602,715

UNITED STATES PATENT OFFICE 2,602,715

PISTON RING

John F. Shirk, Hagerstown, Ind., assignor to Perfect Circle Corporation, Hagerstown, Ind., a corporation of Indiana Application February 17, 1950, Serial No. 144,660

14 Claims. (Cl. 309—44)

1

The invention relates generally to piston rings for internal combustion engines or the like, and more particularly to a piston ring made of sheet metal.

The general object of the invention is to provide a novel sheet metal ring capable of functioning effectively as an oil ring and which is highly flexible circumferentially so as to readily conform to the shape of the cylinder in which it operates.

Another object is to provide a novel piston ring which is circumferentially expansible to hold it in engagement with the cylinder wall, and which is of such construction that the ring continues to exert a substantial expanding force against the cylinder wall even after the outer periphery of the ring becomes considerably worn.

A further object is to provide a novel sheet metal piston ring of the type having a pair of segmental rails, in which opposite segments in the respective rails have a relatively stiff connection with each other, and such connection is unaffected by the circumferential expansion or contraction of the ring.

More broadly stated, it is an object to provide a piston ring comprising a pair of segmental rails, in which the segments of the respective rails are held in substantial alignment without being affected by the circumferential expansion and contraction of the ring.

Still another object is to provide a novel sheet metal piston ring of the foregoing character, which has adequate provision for the flow of oil inwardly through the ring.

Other objects and advantages will appear from the following description taken in connection with the accompanying drawings, in which:

Figure 1 is a plan view of a piston ring embodying the features of the invention.

Fig. 2 is an enlarged view of a portion of a strip of metal which is used to form the ring, and showing the manner in which it is initially punched.

Fig. 3 is an enlarged plan view of a portion of the strip after it has been folded, but before being bent into circular form.

Fig. 4 is an enlarged outer edge view of the folded strip as shown in Fig. 3.

Fig. 5 is an enlarged transverse sectional view taken on the line 5—5 of Fig. 4.

Fig. 6 is an enlarged transverse sectional view taken on the line 6—6 of Fig. 4.

Fig. 7 is an enlarged fragmentary perspective view of a finished ring.

Numerous forms of sheet metal rings have been designed, and the general object of such rings is to obtain one which has sufficient flexibility to conform closely to the cylinder wall when in operation. A difficulty encountered with many of these rings, however, is that in attaining the desired flexibility to provide the desired adherence to the cylinder wall, the ring is so flexible in other directions that it permits oil leakage to an undesirable extent. Another difficulty encountered with many of these rings is that as they wear, the spring pressure which is inherent in the ring initially is lost to too great an extent and after such wear it will not function properly.

A sheet metal ring embodying the features of the invention avoids these difficulties and, while having sufficient flexibility to closely conform to the cylinder wall, such flexibility does not render it ineffective to control oil. Furthermore, the ring has a low spring rate so that it continues to exert a substantial expanding force against the cylinder wall even after it undergoes considerable wear. The ring is of the segmental type comprising two rows of aligned segments axially spaced from each other and constituting cylinder engaging flanges or rails. Each segment in one rail is connected to the adjacent segment in the opposite rail by a web member which is relatively rigid so that the two segments are thereby maintained in a predetermined spaced relation to each other. Moreover, such web member holds the two segments of the respective rails in parallel relation.

The two segments with their connecting web member may be said to constitute a section of the ring and are generally U-shape. The sections are integrally connected to each other circumferentially of the ring by means which provide flexibility, giving the ring as a whole its characteristic of close adherence to the cylinder wall. Such means also has the proper spring rate to provide an expanding force in the ring which remains sufficient to make the ring function properly even when the edges of the segments become considerably worn by contact with the cylinder wall. The ring will thus continue to perform its function of oil control through a long period of use. The means resiliently connecting the respective sections is of such character, and the forces resulting from the flexing thereof, are such that there is no tendency to cause misalignment of the respective sections, so that their only effect is to provide for circumferential expansion and contraction between the segments to cause the ring to conform to the cylinder wall.

The preferred embodiment of the ring, illustrated in the drawing, is made from an elongated strip of sheet metal which is first punched and sheared in the manner shown in Fig. 2. Thus, the strip is punched to provide a series of segments 10 extending along one side of the strip with each segment having a web member 11 extending transversely of the strip from the segment. At the opposite side of the strip, shear cuts 12 are made to provide segments 13, which are also integrally connected to the web members 11. At the inner ends of the shear cuts 12 small holes 14 are punched to relieve stresses at that point and prevent tearing of the metal beyond the holes 14. The strip is also punched to provide elongated connecting members 15 and 16 which, in the strip, are laterally spaced from each other as illustrated in Fig. 2.

It will be noted that each member 15 is laterally spaced from the segments 10 at its two ends to provide notches 17, while each member 16 is separated from the segments 13 at its two ends only by the shear cuts 12.

The members 15 and 16 are then bent into the form of generally circular loops 20 and 21, each member 15 forming a loop 20 and each member 16 forming a loop 21. The strip is also bent along longitudinal lines, indicated at 22 and 23, so that each web member 11 is given a U-shape with the segments 10 and 13 extending from the ends of the arms of U. Each web member 11 with the connected segments 10 and 13 thus forms a section of the ring, and the section as a whole may, therefore, be said to be U-shape in cross section. The folding along the longitudinal lines 22 and 23 brings the loops 20 and 21 into overlapping relation with each other, with the loop 21 which is formed from the member 16 lying radially outside of the loop 20 which is formed from the member 15, since the member 16 is closer to the adjacent edge of the strip than the member 15 is to its adjacent strip edge. The formation of the loops shortens the strip longitudinally and thus draws the segments on each side of the strip close to to each other to form two rows or rails. However, since the web members 11 are substantially narrower than the segments 10 and 13, as is clearly apparent in Fig. 2, slots 25 are formed in the ring between the web members, as illustrated in Figs. 3 and 7. The folding of the strip along the lines 22 and 23 also places the loops 20 and 21 so that they extend from opposite sides of the ring, but it will be apparent that all of the loops 20 extend from the same side while all of the loops 21 extend from the other side. The loops 20 and 21 are of such dimension that they project into the slots 25, the notches 17 providing space for the loop 21 between the loop 20 and the inner edge of the segments 10. In the preferred form, the loops 20 and 21 are flattened slightly at their mid point, as indicated at 26, and outer flattened surfaces at the extremities of the loops preferably lie substantially in the planes of the upper and lower sides of the ring. However if it is preferred to grind the upper and lower sides of the ring, then such outer flattened surfaces of the loops are given a slight clearance from such planes so that, in grinding, the loops will not be touched by the grinding and consequently the loops will not be weakened.

The strip is then given a circular form with the ends of the strip abutting each other as shown in Fig. 1. The ring is thus ready for finished grinding, which consists in grinding the periphery of the segments 10 and 13 to bring them to the desired outside diameter for the ring. The upper and lower sides of the ring may also be ground, as suggested above, so that the ring will have uniform surfaces to engage the sides of the groove in the piston, if after bending the punched strip the segments are out of alignment.

In the finished ring, the loops 20 and 21 are given such shape as to provide a slight space between adjoining segments in the respective rails, and when the ring is placed in the groove in the piston and the piston is placed in the cylinder, the ring is compressed slightly to cause compression of the loops 20 and 21. The loops thus provide an expansive force tending to increase the circumferential length of the ring, thereby holding it in engagement with the cylinder wall. However, expansion and contraction of the loops 20 and 21 will not affect the relative positions of the two segments 10 and 13 forming each section of the ring, since these two segments are held properly spaced from one another by the relatively rigid web member 11. Moreover, the web member 11 prevents each of the pairs of segments 10 and 13 from being forced out of parallelism. The forces exerted on adjoining section by each pair of loops 20 and 21 is more or less balanced since one loop extends from the bottom of the ring toward the top, while the other loop extends from the top of the ring toward the bottom. While the centers of curvature of the two loops of each pair are vertically spaced a short distance, the two loops may be said to be radially aligned, as is apparent in Figs. 4 and 7, and provide relatively large areas therethrough for the flow of oil scraped from the cylinder wall by the segments. The slots 25 between the web members 11 are also in line with the areas within the loops, so that the oil may flow freely to the inside of the ring groove in the piston for return to the crankcase through the usual drainage holes at the bottom of the ring groove.

I claim:

1. A piston ring comprising a plurality of U-shaped sections integrally connected by pairs of oppositely positioned loops extending axially.

2. A piston ring comprising a plurality of U-shaped sections flexibly connected with each other, the connections extending from both arms of the U in overlapping pairs.

3. A piston ring comprising a plurality of U-shaped sections flexibly connected by overlapping loops extending from the arms of the U.

4. A piston ring comprising a plurality of U-shaped sections with the arms of the U forming the top and bottom of the ring, and circular flexible loops connecting the sections and extending axially from both the top and bottom of the ring.

5. A piston ring comprising a plurality of sections each comprising a pair of axially spaced segments and a web member having radially extending portions connected by an axially extending portion, each pair of adjacent sections being connected by a pair of flexible connections integral with and extending from the said radially extending portions.

6. A piston ring comprising a plurality of sections, each comprising a pair of axially spaced segments and a web member having upper and lower radially extending portions connected by an axially extending portion, the upper radially extending portion of each web member being flexibly connected to the upper radially extending portions of the adjacent web members on both sides thereof and the lower radially extending portion being flexibly connected to the lower radially extending portions of the adjacent web members on both sides thereof to connect the sections together.

7. A piston ring comprising a plurality of sections each comprising a pair of axially spaced segments and a web member having upper and lower radially extending portions connected by an axially extending portion, and flexible loops connecting the upper radially extending portions, and other flexible loops connecting the lower radially extending portions to connect the sections together and radially offset from the first-mentioned loops.

8. A piston ring comprising a plurality of U-shape sections, and a pair of loops connecting each section with the adjoining section, one loop extending downwardly and the other loop extending upwardly in overlapping relation to each other.

9. A piston ring comprising a plurality of U-shape sections, and a pair of loops connecting each section with the adjoining section, one loop extending downwardly and the other loop extending upwardly with the two loops substantially radially aligned.

10. A piston ring comprising two axially spaced rows of segments, the segments in the lower row being connected to the segments in the upper row by web members circumferentially separated by slots, and a pair of loops connecting adjoining web members with one loop extending from the upper portion of the slot downwardly into the lower portion of the slot and the other loop extending from the lower portion of the slot upwardly into the upper portion of the slot.

11. A piston ring comprising two axially spaced rows of segments, the segments in the lower row being connected to the segments in the upper row by web members circumferentially separated by slots, and a pair of loops connecting adjoining web members, each pair of loops extending axially and being substantially radially aligned with each other and with the slot to provide openings for the free flow of oil through the ring.

12. A piston ring comprising a plurality of U-shape sections, and pairs of loops connecting the sections with the adjoining sections, one loop of each pair extending from one side of the ring and the other loop extending from the other side of the ring and located radially outside the one loop, all the inner loops extending from the same side of the ring and all the outer loops extending from the other side of the ring.

13. A piston ring comprising a plurality of sections, each comprising a pair of axially spaced segments connected by a web member extending radially inward from the segments and then axially, the web members being substantially narrower than the segments, and flexible loops extending from the edges of the inwardly extending portions of the web members and bent to extend axially between the upper and lower sides of the ring.

14. A piston ring comprising a plurality of sections, each comprising a pair of axially spaced segments connected by web members, the web members being substantially narrower than the segments to provide slots between adjoining web members, and flexible loops connecting the sections and extending into said slots at the top and bottom of the ring, the upper and lower extremities of the respective loops lying substantially in the planes of the upper and lower sides of the ring.

JOHN F. SHIRK.

REFERENCES CITED

The following references are of record in the file of this patent:

UNITED STATES PATENTS

| Number | Name | Date |
| --- | --- | --- |
| 2,296,332 | Bowers | Sept. 22, 1942 |
| 2,330,550 | Bowers | Sept. 28, 1943 |
| 2,426,385 | Bowers | Aug. 26, 1947 |